US007767032B2

(12) United States Patent
Sheng et al.

(10) Patent No.: US 7,767,032 B2
(45) Date of Patent: Aug. 3, 2010

(54) NO-CLEAN LOW-RESIDUE SOLDER PASTE FOR SEMICONDUCTOR DEVICE APPLICATIONS

(75) Inventors: Quan Sheng, Apex, NC (US); Muriel Thomas, Dietzenbach (DE); Jens Nachreiner, Gelnhausen (DE)

(73) Assignee: W.C. Heraeus Holding GmbH, Hanau (DE)

( * ) Notice: Subject to any disclaimer, the term of this patent is extended or adjusted under 35 U.S.C. 154(b) by 112 days.

(21) Appl. No.: 11/479,374

(22) Filed: Jun. 30, 2006

(65) Prior Publication Data

US 2008/0000549 A1 Jan. 3, 2008

(51) Int. Cl.
*B23K 35/34* (2006.01)
(52) U.S. Cl. .......................................... 148/23; 148/24
(58) Field of Classification Search .................. 148/23, 148/24; 219/85.2
See application file for complete search history.

(56) References Cited

U.S. PATENT DOCUMENTS

| | | | |
|---|---|---|---|
| 3,915,729 A | 10/1975 | Eustice | |
| 4,298,407 A | 11/1981 | Taylor | |
| 4,460,414 A | 7/1984 | Hwang | |
| 4,541,876 A | 9/1985 | Hwang | |
| 4,557,767 A | 12/1985 | Hwang | |
| 4,619,715 A | 10/1986 | Hwang | |
| 4,759,490 A | 7/1988 | Ochiai | |
| 4,919,729 A | 4/1990 | Elmgren et al. | |
| 4,994,119 A | 2/1991 | Gutierrez et al. | |
| 5,176,759 A | 1/1993 | Taguchi | |
| 5,211,763 A | 5/1993 | Takemoto et al. | |
| 5,919,317 A | 7/1999 | Tanahashi et al. | |
| 6,103,549 A | 8/2000 | Henderson et al. | |
| 6,468,363 B2 | 10/2002 | Henderson et al. | |
| 6,887,319 B2 * | 5/2005 | Suga et al. ..................... 148/23 | |
| 2002/0050305 A1 | 5/2002 | Taguchi et al. | |
| 2003/0221748 A1* | 12/2003 | Arzadon et al. ............... 148/23 | |
| 2005/0056687 A1* | 3/2005 | Matsumoto et al. ...... 228/248.1 | |
| 2005/0222332 A1* | 10/2005 | Nakagawa et al. .......... 525/104 | |

FOREIGN PATENT DOCUMENTS

| | | | |
|---|---|---|---|
| JP | 56-154 297 A | | 11/1981 |
| JP | 57 118891 A2 | | 7/1982 |
| JP | 59 153594 A | | 9/1984 |
| JP | 60 180 690 A | | 9/1985 |
| JP | 60 257988 A | | 12/1985 |
| JP | 06 108 491 A | | 5/1986 |
| JP | 06 178 589 A | | 5/1986 |
| JP | 06 1108491 A | | 5/1986 |
| JP | 02 025291 A | | 1/1990 |
| JP | 06087090 A | * | 3/1994 |
| JP | 06 115 798 A | | 4/1994 |
| JP | 06 178 589 A | | 6/1994 |
| JP | 06087090 | | 3/2004 |
| WO | 0187535 | | 11/2001 |

OTHER PUBLICATIONS

Notification Concerning Transmittal of International Preliminary Report on Patentability (Chapter I of the Patent Cooperation Treaty) PCT/EP2007/005192, Jan. 6, 2009.
Written Opinion of the International Searching Authority (PCT/EP2007/005192), Jan. 6, 2009.
International Search Report (PCT/EP2007/005192), Oct. 25, 2007.

* cited by examiner

*Primary Examiner*—Roy King
*Assistant Examiner*—Weiping Zhu
(74) *Attorney, Agent, or Firm*—Kalow & Springut LLP; William D. Schmidt

(57) ABSTRACT

A no-clean low residue solder paste is described for die-attach dispensing or fine pitch printing of semiconductor devices. The solder paste has a homogeneous consistency with no tendency to paste separation. The ultimately remaining residue is clear and crystal like and is compatible with further processing steps without prior cleaning with a solvent to remove flux residue. The solder paste comprises a relatively low amount of rosin in combination with a viscous solvent system, thixotropic agents, activators, additives and optionally plasticizers.

18 Claims, No Drawings

NO-CLEAN LOW-RESIDUE SOLDER PASTE FOR SEMICONDUCTOR DEVICE APPLICATIONS

FIELD OF INVENTION

The invention relates to a no-clean, low residue solder paste for die-attach or reflow soldering of semiconductor devices. The solder paste has a homogeneous consistency with no tendency to paste separation. The ultimately remaining residue is clear and crystal like and is compatible with further processing steps without prior cleaning with a solvent to remove flux residue.

BACKGROUND OF INVENTION

Solder pastes are bonding materials prepared by dispersing a solder powder in a flux, commonly also designated as vehicle. Solder pastes are applied e.g. to a printed circuit board by screen printing using a stencil or to any metalized surface by dispensing through a syringe so as to deposit a suitable small amount of the paste on each area to be soldered and are subsequently heated in a furnace to melt the solder and perform bonding. This soldering technique is generally called reflow soldering. Various heating methods including infrared heating, laser heating, hot air heating, and hot plate heating can be employed in the reflow furnace. Solder pastes must have certain rheological properties suitable for screen printing or dispensing.

The flux or vehicle of a solder paste comprises at least one activator, which can remove oxide layers from the bonding surfaces and from the solder powder to allow good bonding. The flux further comprises components, which adjust the rheological properties of the paste. The major components of conventional flux are rosins and rosin derivatives used at a concentration of 40 to 70 wt.-%, and a combination of solvents used at a concentration of 20 to 50 wt.-%, each relative to the total weight of the flux.

One drawback of such conventional fluxes is the fact that a considerable amount of the rosin and other solid components of the flux remain on or in the vicinity of the resulting soldered joint as a flux residue. During reflow, many chemical reactions take place between rosin, other components of the flux, and metal oxides on the solder alloy surfaces. The non-volatile part of the reaction products and inert components of the raw materials remain as residue on the workpieces. Commercial no-clean solder pastes have residues of 6 to 7 wt.-%.

The residue, if remaining in a significant amount, leads to a bad appearance of the soldered areas and impairs the contact of the pins of an electronic part to be soldered with the solder paste. Furthermore, the flux residue may cause the insulation resistance between circuits of the workpiece to decrease due to moisture absorption by the flux residue or may cause the circuits to be broken or disconnected by the formation of corrosion products from the flux residue. Therefore, workpieces intended for use in electronic equipment for which high reliability is required have to be washed with a cleaner, after reflow soldering, in order to remove the flux residue remaining in the soldered areas.

Frequently, electronic equipment has to be sealed against moisture to increase reliability. Sealing is done by resin molding the entire workpiece. In such a case, the workpiece must be washed with a cleaner to remove any flux residue prior to resin coating or molding. Cleaner on the basis of fluorinated and chlorinated solvents have been successfully used to dissolve the rosin in the flux residue. However, the necessity to clean the workpieces prior to resin molding introduces an additional costly production step. Moreover, the use of these solvents is now regulated since their vapors cause ozone depletion in the atmosphere.

Therefore solder pastes with low flux residue, so-called no-clean solder pastes, have been developed in the past. U.S. Pat. No. 5,176,759 e.g., discloses a solder paste with minimized flux residue remaining after soldering which comprises a powdered solder and a flux in admixture. The flux comprises from about 5% to about 40% by weight of carrier components which comprise a rosin or a rosin derivative, an activating agent, and a thixotropic agent and from about 60% to about 95% by weight of a solvent. The solvent predominantly (more than 50% by weight) comprises a 2-alkyl-1,3-hexanediol having 1 to 4 carbon atoms in the alkyl group. The viscosity of 2-alkyl-1,3-hexanediol used in the solvent is low—typically in the range of about 323 cps at 20° C. In this patent the remaining residue is visually observed and assigned one of four grades 1 to 4. No percentages of remaining flux are given. The decreased flux residue remaining after reflow soldering with this type of solder paste causes no substantial problems in ordinary electronic equipment for which high reliability is required. However, the decreased residue solder paste is not completely satisfactory for present-day electronic equipment for which ultrahigh reliability is required.

U.S. Pat. No. 6,887,319 B2 discloses a residue-free solder paste that does not contain any rosin. The residue-free solder leaves little or no flux residue after reflow soldering and comprises a solder powder mixed with a rosin-free pasty flux. The flux comprises at least one solid solvent and at least one highly viscous solvent in a total amount of 30 to 90 mass %, in addition to at least one liquid solvent, all the solvents vaporizing at a reflow soldering temperature. The flux may further contain 0.5 to 12% of a thixotropic agent such as a fatty acid amide and 1 to 15% of an activator selected from organic acids and their amine salts, the thixotropic agent and activator vaporizing in the presence of the solvents while the solvents are vaporizing. This solder paste seems to be satisfactory from the amount of residue left after reflow soldering, but it is still not satisfactory with regard to homogeneity, stability against paste separation, and wetting requirement.

Thus, there is a continued need for a good wetting, highly stable and homogeneous low-residue solder paste with at most 2% of the flux remaining after reflow soldering. The flux residue should be compatible with further processing steps, even if molding process has to be performed, thus avoiding the necessity to remove the flux residue by washing.

SUMMARY OF THE INVENTION

In various embodiments, the invention provides a low-residue solder paste. The flux-residue remaining after reflow soldering is clear, hard and crystal like and is compatible with further processing steps without prior washing the residue away. The solder paste withstands reflow peak temperatures up to 390° C. The remaining residue withstands molding temperatures of up to 185° C.

In various embodiments, the solder paste comprises a solder powder dispersed in a flux, the flux comprising a homogeneous mixture of a solvent system, at least one thixotropic agent, at least one activator, and a rosin, wherein the solvent system comprises a highly viscous solvent and/or solid solvent at room temperature and the concentration of the solvent system amounts to 55 to 75 wt.-% and the concentration of the rosin amounts to 10 to 25 wt.-%, each relative to the total weight of the flux.

For a better understanding of the present invention together with other and further advantages and embodiments, reference is made to the following description taken in conjunction with the examples, the scope of which is set forth in the appended claims.

DETAILED DESCRIPTION OF THE INVENTION

The invention will now be described in connection with preferred embodiments. These embodiments are presented to aid in an understanding of the present invention and are not intended to, and should not be construed to, limit the invention in any way. All alternatives, modifications and equivalents, which may become obvious to those of ordinary skill on reading this disclosure are included within the spirit and scope of the present invention.

In various embodiments, the solder paste of the present invention has only a very low flux-residue of at most 2% of the flux. The residue is non-conductive, chemically inert, hard and crystal clear. The residue of the solder paste, according to various embodiments of the invention, must not be washed away before the further assembly process, thus reducing assembly costs.

The solder paste comprises a solder powder dispersed in a flux. As designed, the beneficial properties of the solder paste can be achieved with a flux which comprises a homogeneous mixture of a solvent system, at least one thixotropic agent, at least one activator, and a rosin, wherein the solvent system comprises a highly viscous solvent and/or solid solvent and the concentration of the solvent system amounts to 55 to 75 wt.-% and the concentration of the rosin amounts to 10 to 25 wt.-%, each relative to the total weight of the flux.

Preferably the solder paste comprises 80 to 90 wt.-% of the solder powder and the balance being the flux.

The flux of the solder paste comprises a relatively low amount of rosin in relation to solvents. To guarantee a sufficiently high viscosity of the solder paste, the solvent system comprises a highly viscous solvent and a solid solvent at room temperature. The term "highly viscous solvent" as used herein indicates that it has a viscosity of at least 10,000 cps at 30° C. with rheological properties like a heavy syrup at room temperature. More preferably the viscosity of the highly viscous solvent is more than 100,000 cps. By the term "solid solvent" is meant that the solvent is in solid state at room temperature.

A homogenous mixture includes a uniform intermixture of solvents (e.g. uniform intermixture of highly viscous solvent and/or solid solvent). In various embodiments the homogenous mixture includes a uniform intermixture of solvents (e.g. uniform intermixture of highly viscous solvent, solid solvent, glycol ether, and/or alcohol). This solvent system improves stability of the flux.

In addition to the highly viscous solvent and/or solid solvent, the solvent system comprises one or more alcohols and one or more glycol ethers that have a lower viscosity than the highly viscous solvent.

Preferably, the homogenous mixture of the solvent system includes a mixture of highly viscous solvent and/or solid solvent at room temperature selected from the group consisting of trimethylopropane, 1,2-octanediol, 1,8-octanediol, 2,5-dimethyl-2,5-hexanediol, isobornyl cyclohexanol, or a combination thereof.

The glycol ether is selected from the group consisting of mono-, di- or tri-propylene glycol methyl ether, mono-, di-, or tri-propylene glycol n-butyl ether, mono-, di-, or tri-ethylene glycol n-butyl ether, ethylene glycol methyl ether, tri-ethylene glycol methyl ether, di-ethylene glycol di-butyl ether, tetra-ethylene glycol di-methyl ether or a combination thereof.

The alcohols are preferably selected from the group consisting of 2-ethyl-1,3-hexanediol, n-decyl alcohol, 2-methyl-2,4-pentanediol, terpineol and isopropanol or mixtures thereof.

Best results were achieved with a solvent system comprising 30 to 50 wt.-% of a highly viscous solvent and/or solid solvent at room temperature, 10 to 30 wt.-% of glycol ether, and 10 to 20 wt.-% of alcohols, each relative to the total amount of flux.

The rosin is selected from the group consisting of tall oil rosin, hydrogenated rosin, partially hydrogenated rosin, dehydrogenated rosin or a combination thereof. Most preferably hydrogenated rosins or tall oil rosins are used.

To modify the rheological properties of the flux it comprises preferably 1 to 6 wt.-% of thixotropic agents selected from the group consisting of glyceryl tris-12-hydroxy stearate, modified glyceryl tris-12-hydroxy stearate, polyamide, stearamide or a combination thereof. Most preferred are glyceryl tris-12-hydroxy stearate or stearamide.

The activators preferably amount to 10 to 20 wt.-% relative to the total amount of flux. To obtain good wetting properties, a combination of organic acids with amines are used as activators. The organic acids are selected from the group consisting of caproic acid, phenyl-acetic acid, benzoic acid, salicylic acid, aminobenzoic acid, 4-n-butylbenzoic acid, 4-t-butylbenzoic acid, 3,4-dimethoxybenzoic acid, oxalic acid, succinic acid, maleic acid, malic acid, adipic acid, malonic acid and mixtures thereof. The amines are selected from the group consisting of monoethanolamine, diethanolamine, triethanolamine, isopropanolamine or a combination thereof. Good results were achieved with activators comprising 5 to 15 wt.-% of organic acids and 1 to 10 wt.-% of amines, wherein 4-n-butylbenzoic acid or 4-tert-butylbenzoic acid are used as organic acid and monoethanolamine or diethanolamine are used as an amine.

To further improve wettability of the solder paste 0.5 to 3 wt.-% of additives can be added to the flux. Especially the additive is selected from the group consisting of ethoxylated amine rosin, amine rosin, methyl ester of rosin, n-oleylsarcosine and oleyl imidazoline or mixtures thereof.

The solder paste may comprise any useful solder alloy powder for electronic applications e.g. high-lead containing alloys with at least 85 wt.-% of lead for die-attach applications such as PbSn-alloys, PbSnAg-alloys, PbAg-alloys or PbInAg-alloys. Specific examples of such alloys are Pb90Sn10, Pb88Sn10Ag2, Pb92.5Sn5Ag2.5, Pb95.5Sn2Ag2.5, Pb97Ag3 and Pb92.5In5Ag2.5. Other suitable lead containing solder alloys are SnPb-alloys, SnPbAg-alloys, SnPbBi-alloys and PbSnSb-alloys which are used for SMT applications. Lead-free solder alloys for SMT-applications can also be used e.g. SnAgCu-alloys, SnAg-alloys, SnCu-alloys, SnCuIn-alloys, SnAgCuSb-alloys, SnAgSb-alloys, SnSb-alloys and BiSn-alloys. Specific lead containing alloys for SMT-applications are Sn63Pb37 and Sn62Pb36Ag2 while the lead free solder alloys for SMT-applications may be selected from Sn96.5Ag3.5, Sn95.5Ag4Cu0.5, Sn96Ag3.5Cu0.5 and Sn96.5Ag3Cu0.5.

For surface mount technology applications it is preferred that the solder flux further comprises 0.1 to 2 wt.-% of a plasticizer which may be selected from the group consisting of dimethyl phthalate, dibutyl phthalate, diisodecyl phthalate, butyl oleate, diisobutyl adipate, dioctyl adipate, dipropylene glycol dibenzoate, dioctyl sebacate and mixtures thereof. For these applications, too, the solder paste may comprise a lead free or a lead containing solder alloy.

For these applications the solvent system is preferably modified so as to comprise 20 to 40 wt.-% of a very viscous solvent and/or solid solvent at room temperature and 30 to 50 wt.-% of alcohols. Again the activators comprise 5 to 15 wt.-% of an acid and 1 to 10 wt.-% of an amine, each relative to the total amount of flux.

The paste compositions given above provide good solderability. During reflow, solder paste heats to about 140 to 160° C., the flux begins to activate and solvents begin to volatilize. As temperature continues to increase, the activators start to remove oxides from the surface of the alloys and parts, promoting wetting for a good joint formation. In addition, the rosin begins to melt forming a protective coat around the solder powder particles to minimize re-oxidation as temperature continues to rise. The amount of rosin and activator specified above are sufficient to fulfill these functions until complete alloy coalescence occurs, thus reducing the potential for solder ball formation.

The dispensing properties of a solder paste are very important. They are affected by the formulation of the flux and further by particle size distribution and morphology of the solder powder. For easy dispensing, the powder particles should have a spheroidal morphology.

Preparation of the solder paste according to the invention is done by first adding the selected solvents into a vessel, heating and stirring them. When the temperature reaches approximately 100° C. rosin and thixotropic agents are added. After dissolution of rosin and thixotropic agents the acidic activators are added. After all of solids are dissolved heating is turned off to cool the system. At approximately 50° C. the amine components of the activators are added and the composition is allowed to cool down to room temperature under continued stirring.

Having now generally described the invention, the same may be more readily understood through the following reference to the following examples, which are provided by way of illustration and are not intended to limit the present invention unless specified.

Example 1

In this example a solder paste according to the invention was prepared which can be applied to a workpiece by dispensing.

For preparing the solder paste 85 parts by weight of the solder alloy Sn5Pb92.5Ag2.5 (−325 to +500 mesh) were mixed with 15 parts by weight of a flux.

The flux consisted of 30 wt.-% of isobornyl cyclohexanol, 5 wt.-% of 1,2-octanediol (very viscous solvent and solid solvent), 13 wt.-% of butyl carbitol (ethylene glycol ether), 14 wt.-% of 2-ethyl-1,3-hexanediol, 4 wt.-% of isopropanol (alcohol), 16 wt.-% of Foral AX (hydrogenated rosin, trade name of company Hercules), 3 wt.-% of stearamide (thixotropic agent), 5 wt.-% of 4-n-butylbenzoic acid, 5 wt.-% of salicylic acid (activator), 4 wt.-% of diethanolamine (activator), and 1 wt.-% of Polyrad 1110 (additive, trade name of company Hercules).

Each component of the flux was added, heated, and dissolved in a glass beaker using a mechanical stirring blade to make a solution. After heating and mixing all the different solvents became a homogenous mixture. The paste was made by mixing the solder powder uniformly with the flux. Brookfield viscosity of the flux was 30 to 100 kcps, and 200 to 300 kcps for the paste.

The no-clean paste made by this flux shows very good dispensability, solderability and wetting characteristic, also it showed very good paste stability (no separation occurs during application) with about 2% of residue remaining.

Example 2

In this example a solder paste according to the invention was prepared which can be applied to a workpiece by fine pitch printing.

For preparing the solder paste 88 parts by weight of the solder alloy Sn96.5/Ag3.5 (−325 to +500 mesh) were mixed with 12 parts by weight of a flux.

The vehicle consisted of 20 wt.-% of isobornyl cyclohexanol, 6 w.-t % of trimethylopropane (very viscous solvent and solid solvent, 27 wt.-% of terpineol, 5 wt.-% of 2-ethyl-1,3-hexanediol, 5 wt.-% of isopropanol (alcohol), 16 wt.-% of Foral AX (hydrogenated rosin), 5 wt.-% of stearamide (thixotropic agent), 5 wt.-% of 4-n-butylbenzoic acid, 5 wt.-% of benzoic acid, 4 wt.-% of diethanolamine (activator), 1 wt.-% of Polyrad 1110 (additive), and 1 wt.-% of dimethylphthalate (plasticizer).

Each component of the flux was added, heated, and dissolved in a glass beaker using a mechanical stirring blade to make a solution. After heating and mixing all the different solvents became a homogenous mixture. The paste was made by mixing solder powder uniformly with flux. Brookfield viscosity of the flux was 20 to 80 kcps, and 600 to 800 kcps for the paste.

The no-clean paste made by this flux shows very good printability, solderability and wetting characteristic, also it shows very good paste stability (no separation occurs during application) with about 2% of residue remaining.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to essential features hereinbefore set forth and as follows in the scope of the appended claims.

What is claimed is:

1. Solder paste for die-attachment of semiconductor devices comprising a solder powder dispersed in a flux, the flux comprising a homogeneous mixture of a solvent system, at least one thixotropic agent, at least one activator, and a rosin, wherein the solvent system comprises one or more glycol ethers, and one or more alcohols, and a highly viscous solvent and/or solid solvent at room temperature and the concentration of the solvent system amounts to 55 to 75 wt.-% and the concentration of the rosin amounts to 10 to 25 wt.-%, each relative to the total weight of the flux and wherein the highly viscous solvent and/or solid solvent are selected from the group consisting of trimethylopropane, 1,2-octanediol, 1,8-octanediol, isobornyl cyclohexanol or a combination thereof.

2. Solder paste for die-attachment of semiconductor devices according to claim 1, wherein the highly viscous solvent and/or solid solvent of the solvent system are vaporized during reflow soldering process.

3. Solder paste according to claim 1, wherein the glycol ether is selected from the group consisting of mono-, di- or tri-propylene glycol methyl ether, mono-, di-, or tri-propylene glycol n-butyl ether, mono-, di-, or tri-ethylene glycol n-butyl ether, ethylene glycol methyl ether, tri-ethylene glycol methyl ether, di-ethylene glycol di-butyl ether, tetra-ethylene glycol di-methyl ether, or a combination thereof.

4. Solder paste according to claim 3, wherein the alcohols are selected from the group consisting of 2-ethyl-1,3-hexanediol, n-decyl alcohol, 2-methyl-2,4-pentanediol, terpineol and isopropanol or mixtures thereof.

5. Solder paste according to claim 4, wherein the rosin is selected from the group consisting of tall oil rosin, hydrogenated rosin, partially hydrogenated rosin, dehydrogenated rosin or a combination thereof.

6. Solder paste according to claim 5, wherein the thixotropic agent is selected from the group consisting of glyceryl tris-12-hydroxy stearate, modified glyceryl tris-12-hydroxy stearate, polyamide, stearamide or a combination thereof.

7. Solder paste according to claim 6, wherein the activator comprises organic acids selected from the group consisting of caproic acid, phenyl-acetic acid, benzoic acid, salicylic acid, aminobenzoic acid, 4-n-butylbenzoic acid, 4-t-butylbenzoic acid, 3,4-dimethoxybenzoic acid, oxalic acid, succinic acid, maleic acid, malic acid, adipic acid, malonic acid and mixtures thereof and the activator further comprises an amine selected from the group consisting of monoethanolamine, diethanolamine, triethanolamine, isopropanolamine or a combination thereof.

8. Solder paste according to claim 7, wherein the paste further comprises an additive selected from the group consisting of ethoxylated amine rosin, amine rosin, methyl ester of rosin, n-oleylsarcosine and oleyl imidazoline or mixtures thereof.

9. Solder paste according to claim 8, wherein the flux comprises 1 to 6 wt.-% of thixotropic agent, 10 to 20 wt.-% of activators and 0.5 to 3 wt.-% of additives each relative to the total amount of flux.

10. Solder paste according to claim 9, wherein the solvent system comprises 30 to 50 wt.-% of a very viscous solvent and/or solid solvent at room temperature, 10 to 30 wt.-% of glycol ether and 10 to 20 wt.-% of alcohols, and the activators comprise 5 to 15 wt.-% of an acid and 1 to 10 wt.-% of an amine, each relative to the total amount of flux.

11. Solder paste according to claim 10, wherein the solder powder is selected from lead containing solder alloys or lead free solder alloys.

12. Solder paste according to claim 11, wherein the lead containing solder alloy is selected from PbSn-, PbSnAg-, PbAg- or PbInAg-alloys with at least 85 wt.-% of lead.

13. Solder paste according to claim 8, wherein the paste further comprises a plasticizer selected from the group consisting of dimethyl phthalate, dibutyl phthalate, diisodecyl phthalate, butyl oleate, diisobutyl adipate, dioctyl adipate, dipropylene glycol dibenzoate, dioctyl sebacate and mixtures thereof.

14. Solder paste according to claim 13, wherein the flux comprises 1 to 6 wt.-% of thixotropic agent, 10 to 20 wt.-% of activators and 0.5 to 3 wt.-% of additives, and 0.1 to 2 wt.-% of plasticizers, each relative to the total amount of flux.

15. Solder paste according to claim 14, wherein the solvent system comprises 20 to 40 wt.-% of a very viscous liquid and/or solid solvent at room temperature, 30 to 50 wt.-% of alcohols, and the activators comprise 5 to 15 wt.-% of an acid and 1 to 10 wt.-% of an amine, each relative to the total amount of flux.

16. Solder paste according to claim 15, wherein the solder powder is prepared from a lead containing or a lead free solder alloy.

17. Solder paste according to claim 16, wherein the lead containing solder alloy is selected from SnPb-, SnPbAg-, SnPbBi-, and PbSnSb-alloys.

18. Solder paste according to claim 16, wherein the lead free solder alloy is selected from SnAgCu-, SnAg-, SnCu-, SnCuIn-, SnAgCuSb-, SnAgSb-, SnSb- or BiSn-alloys.

* * * * *

UNITED STATES PATENT AND TRADEMARK OFFICE
CERTIFICATE OF CORRECTION

PATENT NO. : 7,767,032 B2
APPLICATION NO. : 11/479374
DATED : August 3, 2010
INVENTOR(S) : Sheng et al.

It is certified that error appears in the above-identified patent and that said Letters Patent is hereby corrected as shown below:

ON THE TITLE PAGE:

At Item [73], Assignee, please delete incorrect Assignee's name

"W.C. Heraeus Holding GmbH"

and insert the correct Assignee's name as follows:

--W.C. Heraeus GmbH--

Signed and Sealed this
Twenty-sixth Day of April, 2011

David J. Kappos
*Director of the United States Patent and Trademark Office*